United States Patent [19]

Ellis

[11] 4,123,100
[45] Oct. 31, 1978

[54] WEATHERSTRIP SEALING ARRANGEMENT

[75] Inventor: Jerry Ellis, Dayton, Ohio
[73] Assignee: General Motors Corporation, Detroit, Mich.
[21] Appl. No.: 819,705
[22] Filed: Jul. 28, 1977
[51] Int. Cl.² ............................................. B60J 1/00
[52] U.S. Cl. ...................................... 296/93; 49/490; 52/394
[58] Field of Search .................... 296/93; 49/490, 475; 52/394

[56] References Cited

U.S. PATENT DOCUMENTS

| | | | |
|---|---|---|---|
| 1,706,597 | 3/1929 | Anderson | 296/93 |
| 2,766,494 | 10/1956 | Stremmel | 296/93 |
| 3,177,534 | 4/1965 | Millhouse | 296/93 |

Primary Examiner—Philip Goodman
Attorney, Agent, or Firm—John P. Moran

[57] ABSTRACT

The arrangement shown and described herein is used to seal a closure structure of a vehicle body. A weatherstrip including metal strip inserts is molded in the usual manner and is then crimped into its operational "U" shape around an extruded tubular rubber member located at the bottom of the U-shape, the tubular member substantially filling the space heretofore selectively filled with a bead of butyl mastic sealant. Once the thus formed weatherstrip is installed on a body closure flange or ledge, the edge of the flange or ledge flattens out the tubular member such that the latter effectively and uniformly seals off the inside of the flange or ledge from the outside thereof.

1 Claim, 3 Drawing Figures

WEATHERSTRIP SEALING ARRANGEMENT

This invention relates generally to vehicle body construction and, more particularly, to a sealing arrangement for closure structures of vehicle bodies.

It is customary to use so-called "pinchweld" weatherstrips which (1) mount on a flange of the vehicle deck under the trunk lid, (2) on the hood ledge just in front of the windshield, and (3) on a flange around each door frame. Current practice generally includes crimping the formed strip to form a retention slot therein, and then applying a bead of butyl mastic or other suitable sealant in the bottom of the slot prior to mounting the strip on the flange or ledge. In some instances such bead is applied along an outer edge of the strip after it has been mounted on the flange or ledge. While such arrangements are generally satisfactory, its possible for the mastic sealant to be applied unevenly in the slot and, hence, a leakage therepast may occur.

Accordingly, a general object of the invention is to provide an improved, economical and efficient pinchweld weatherstrip which does not require the separately applied butyl mastic bead.

Another object of the invention is to provide a pinchweld weatherstrip including a separate extruded, closed cell sponge sealant tube in lieu of the separately applied butyl mastic sealant.

A further object of the invention is to provide a pinchweld weatherstrip including either (1) a low density latex foam deflection portion and a high density latex retention portion combined in a molding process, or (2) a closed cell hollow deflection portion and a high density later retention portion combined in an extrusion process, with the retention portion being crimped into a "U"-shape around an extruded closed cell rubber tubular member located at the bottom of the U-shape recess in lieu of the usual bead of butyl mastic sealant.

These and other objects and advantages will become more apparent when reference is made to the accompanying description and drawings, wherein.

Figure 1:
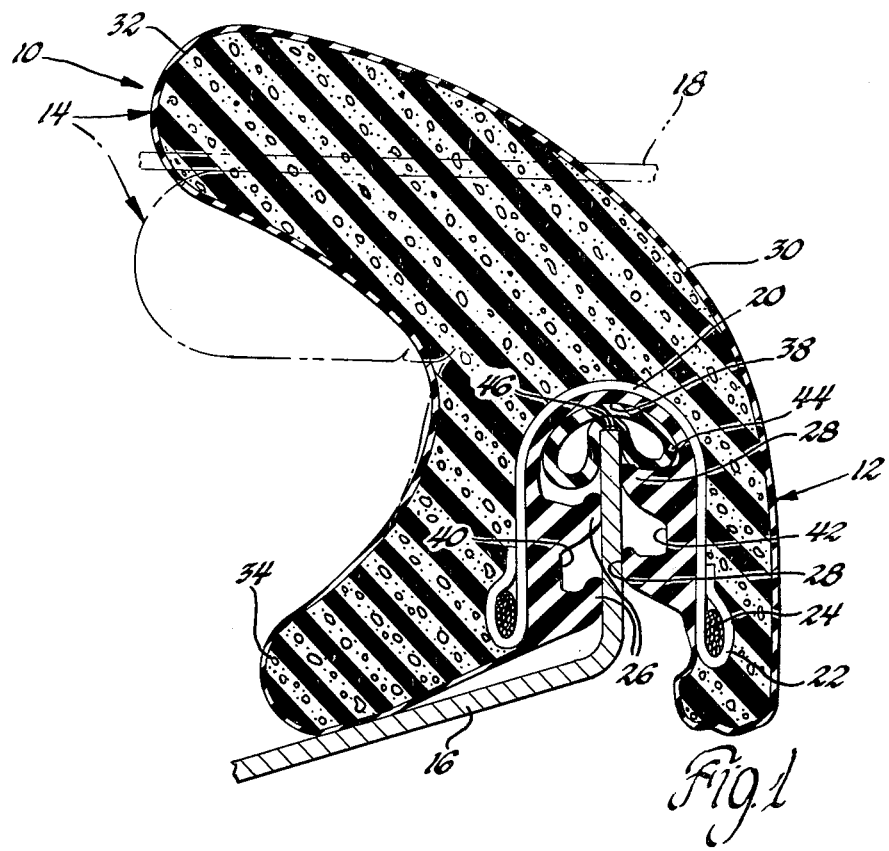
FIG. 1 is a fragmentary cross-sectional view of an automobile closure structure embodying the pinchweld weatherstrip invention.

Referring now to the drawings in greater detail, FIG. 1 illustrates a pinchweld weatherstrip 10 including generally a retention portion 12 and a deflection portion 14. The retention portion 12 is shown installed on a vehicle body flange portion 16, such as a deck flange, a hood ledge, or a door flange, with the respective cooperating body closure member out of contact therewith, as would be the case any time such closure member were opened.

FIG. 1 also illustrates the pinchweld weatherstrip 10 mounted on the flange portion 16, with the cooperating body closure member 18, such as a trunk lid or hood in its closed condition. In this condition the deflection portion 14 of the weatherstrip 10 serves as an efficient upper sealing member by virtue of being retained against the body closure member 18 in a depressed state.

Figure 2:
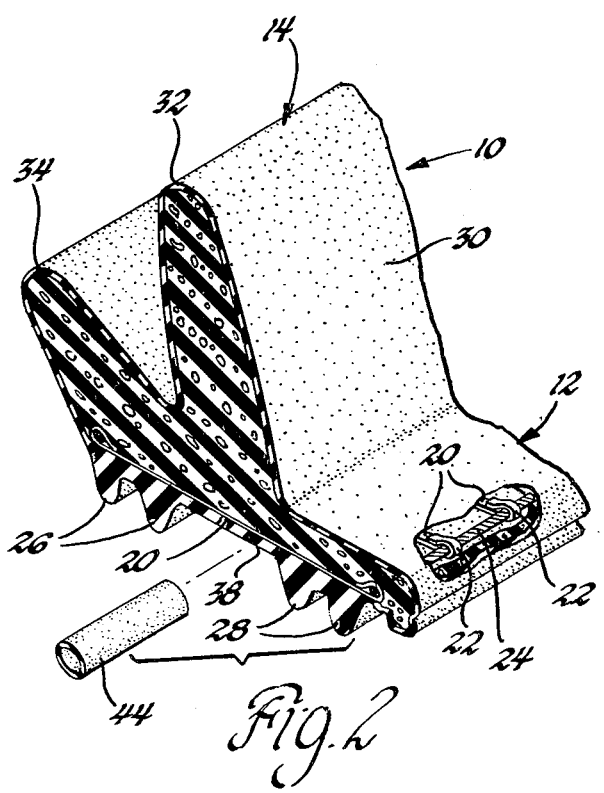
FIG. 2 is a cross-sectional perspective view of a typical weatherstrip in its originally formed configuration.

Referring now to FIG. 2, it may be noted that the weatherstrip 10 is initially formed to include spaced flat metal strips 20, each having the ends 22 thereof rolled or crimped around a cord 24, the latter serving to interconnect the metal strips in the form of a rope ladder in a spaced relationship in the usual manner. The metal strips 20 and the interconnecting cords 24 are covered on one side thereof as a result of a conventional molding operation by a hard or high density latex material, with the usual two pairs of stiff retention lips 26 and 28 formed at predetermined angles adjacent the ends thereof to form the retention portion 12.

The deflection portion 14 is formed on the other side of the metal strips 20 of a soft or low density latex foam material in a molding process concurrently with the retention portion 12. A neoprene coating 30 is applied to the entire surface of the low density latex material to help keep it from tearing or breaking. The deflection portion 14 may assume any desired shape, typically including upper and lower extensions 32 and 34, respectively, adapted to point toward the outside of the vehicle body when assembled on the body flange portion 16 (FIG. 2).

Figure 3:
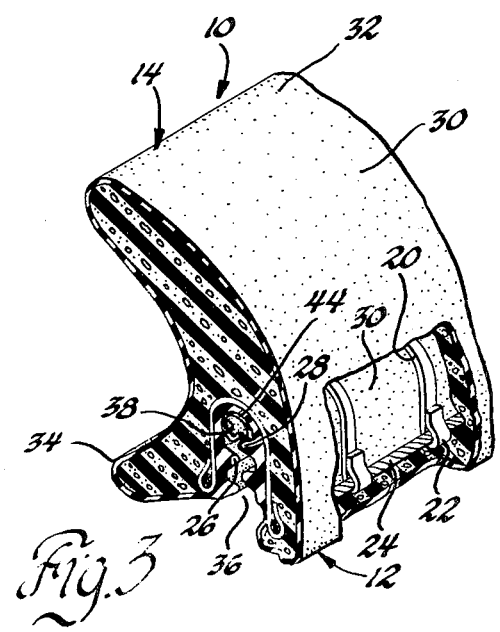
FIG. 3 is a fragmentary perspective of the pinchweld weatherstrip components in their "ready-to-be-installed" configuration.

As seen in FIG. 3, the retention portion 12 is roll formed from the initially formed flat or open configuration of FIG. 2 into a U-shaped recess 36 having an end wall 38 and oppositely disposed side walls 40 and 42. The high density latex material and the metal strips 20 are bent around an extruded closed cell, tubular rubber member 44, thereby retaining the latter inwardly of the retention lips 26 and 28 against the end wall 38. As will be recognized by those skilled in the art, the tubular rubber member 44 substantially fills the space heretofore selectively filled with a butyl mastic or other sealant applied as a bead along the end wall 38 of the recess 36 for insertion thereinto of the edge 46 of the body flange portion 16 when the weatherstrip 10 is installed on such flange portion 16.

In their free state, each of the two pairs of retention lips 26 and 28 extend to the center of the U-shaped recess 36, angling toward the end wall 38 of the recess at their predetermined angle with the inner surfaces or side walls 40 and 42 of the retention portion 12. As a result, the retention lips are spread as the weatherstrip 10 is forced over the body flange portion 16, thereby exerting a pressure, along with the crimped metal strips 20, on the opposite faces of the flange portion sufficient to retain the weatherstrip 10 in place (FIG. 1). When installed, the edge 46 of the body flange portion 16 depresses the hollow or tubular member toward the end wall 38, as shown in FIG. 1, the member 38 thereby effectively and substantially uniformly sealing the outside surface from the inside surface of the body flange portion 16.

It should now be apparent that the invention provides an improved pinchweld weatherstrip wherein a suitable closed cell rubber tubular member is substituted for a separately applied bead of butyl mastic sealant for an effective seal around a vehicle body closure structure.

It should be further apparent that the rubber tubular member can be used in lieu of the butyl mastic bead at the bottom of the retention recess of an extruded weatherstrip, as well as for the molded weatherstrip described herein.

While but one embodiment of the invention has been shown and described, other modifications thereof are possible.

What is claimed is:

1. In a vehicular closure opening and a cooperating body flange, a weatherstrip comprising a molded retention member adapted to being mounted on the body flange and including equally spaced, laterally extending metal strips formed therein and crimped into a U-shaped configuration to form a recess having an end wall and a pair of oppositely disposed side walls, and having a predetermined width for receiving the body flange, and a pair of retention lips formed on each side wall of the U-shaped recess and extending toward the center of the recess to exert a pressure on the body flange to retain the weatherstrip in place thereon, and a flexible tubular member confined against and substantially uniformly depressed toward the end wall of the recess inward of the retention lips, said tubular member adapted to being further depressed toward the end wall of the recess along its entire length by the abutment of the body flange against the center portion thereof to thereby seal off the inside surface of the flange from the outside surface thereof.

* * * * *